(12) United States Patent
Saito (10) Patent No.: US 7,053,609 B2
(45) Date of Patent: May 30, 2006

(54) MAGNETIC SENSOR WITH POINTING CONTROL CIRCUIT

(75) Inventor: Koichi Saito, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 0 days.

(21) Appl. No.: 11/200,117

(22) Filed: Aug. 10, 2005

(65) Prior Publication Data

US 2005/0285593 A1   Dec. 29, 2005

Related U.S. Application Data

(63) Continuation of application No. 10/631,708, filed on Aug. 1, 2003, now Pat. No. 6,937,012.

(30) Foreign Application Priority Data

Aug. 5, 2002   (JP)   ............................ 2002-226863

(51) Int. Cl.
    *G01R 33/07*   (2006.01)
(52) U.S. Cl. .................... 324/252; 324/207.2; 324/251

(58) Field of Classification Search ................. 324/252
    See application file for complete search history.

(56) References Cited

U.S. PATENT DOCUMENTS 6,590,389 B1 *   7/2003   Shibasaki et al. ........... 324/252
2004/0080491 A1   4/2004   Takatsuka et al.

* cited by examiner

*Primary Examiner*—Bot LeDynh
(74) *Attorney, Agent, or Firm*—Sughrue Mion, PLLC (57) ABSTRACT

A configuration comprising a magnetic sensor and a pointing control circuit, for implementing a pointing device, is rendered compact in size. To that end, the pointing control circuit is formed in the central part of an IC chip, substantially square in shape, and Hall elements are provided in four corners of the peripheral region of the pointing control circuit, respectively, thereby forming the magnetic sensor, comprising the Hall elements, integrally with the pointing control circuit. Further, the Hall elements are formed integrally with the pointing control circuit in the step of fabricating an IC, thereby uniting the Hall elements with the pointing control circuit.

10 Claims, 6 Drawing Sheets

MAGNETIC SENSOR WITH POINTING CONTROL CIRCUIT

This is a continuation of Application Ser. No. 10/631,708 filed Aug. 1, 2003 now U.S. Pat. No. 6,937,012. The entire disclosure(s) of the prior application(s), application Ser. No. 10/631,708 is hereby incorporated by reference.

FIELD OF THE INVENTION

The present invention relates to a magnetic sensor of a pointing device, for use as input means of information equipment, such as a personal computer, cellular phone, and so forth, and in particular, to a magnetic sensor with a pointing control circuit, for detecting coordinates by detecting a change in a magnetic field due to movement of a magnet, and information equipment using the same.

BACKGROUND OF THE INVENTION

A pointing device such as a joy stick, track ball, and so forth, has since been in use as input means for a personal computer, cellular phone, and so forth. As a sensor of the pointing device, an optical sensor, a pressure sensitive sensor, variable resistance sensor, and magnetic detection sensor have been put to commercial use, however, among those, the magnetic detection sensor small in size, having a long service life, has lately become a favorite one in the market. In particular, a sensor with Hall elements assembled therein has since been in widespread use because it is small in size and simple in construction.

Figure 13:
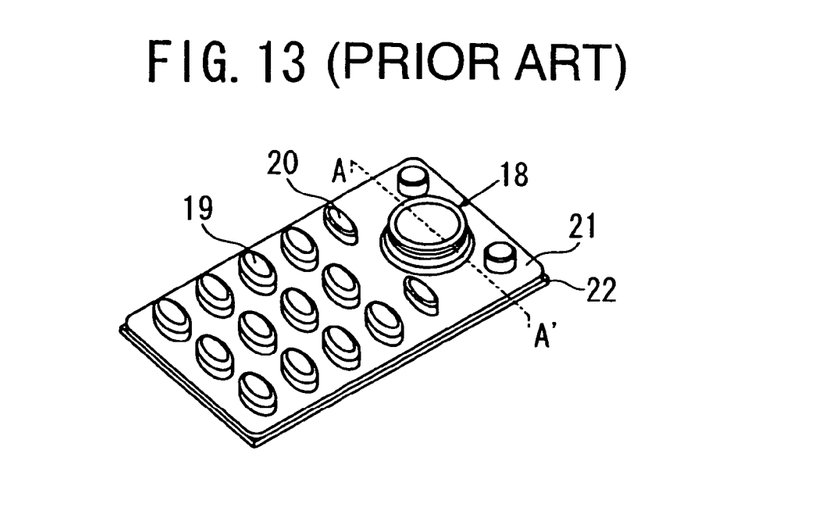
FIG. 13 is a perspective view of a cellular phone.
Figure 14:
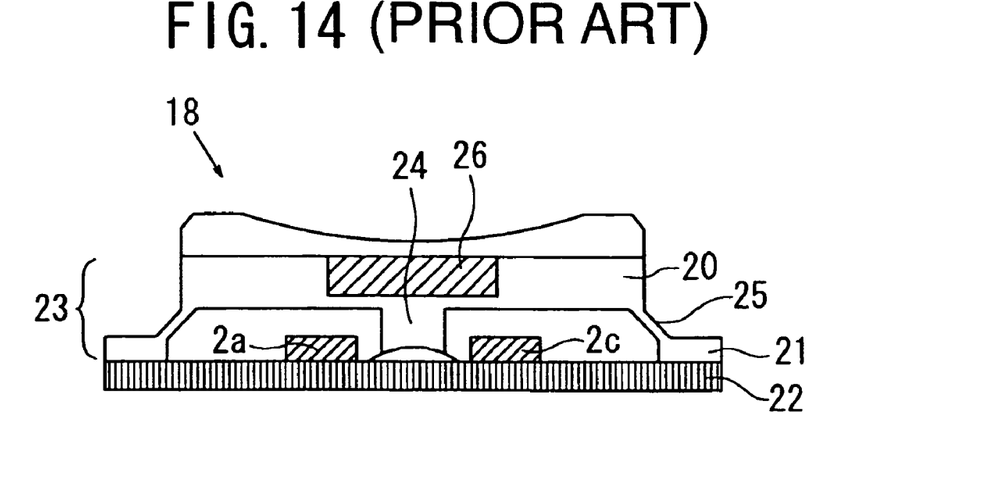
FIG. 14 is a sectional view of the principal part of the cellular phone, taken on line A–A' in FIG. 13.

FIG. 13 is a perspective view of a cellular phone disclosed in JP-A 2002-150904, A, for illustrating the construction of a magnetic sensor for use in a conventional pointing device. FIG. 14 is a sectional view of the principal part thereof, taken on line A–A' in FIG. 13.

In FIG. 14, an input unit 18 which is a part of the pointing device and is made up of a magnetic sensor and a magnet holder, comprises the magnetic sensor made up of four Hall elements, 2a through 2d (Hall elements 2b, 2d are not illustrated), disposed in annular fashion around the center of the input unit 18 on top of a printed circuit board 22, and a magnet holder 23 made of, for example, rubber, wherein a magnet 26 is disposed so as to oppose the Hall elements, 2a through 2d, respectively, with a spacing interposed between the magnet 26 and the respective Hall elements. The magnet holder 23 comprises a key mat 21 annular in shape, disposed on the printed circuit board 22, a bridging part 25 linking the key mat 21 integrally with an input unit body 20 incorporating the magnet 26, and a cylindrical column 24 extended from the center of the underside of the input unit body 20 to the printed circuit board 22.

The input unit body 20 is tilted towards one side when portions thereof, other than the center, are pressed down, whereupon the spacing between the magnet 26 and the respective Hall elements, 2a through 2d, undergoes a change. That is, the Hall elements, 2a through 2d, detect a change in magnetism, accompanying such a change in the respective spacings.

Figure 15:
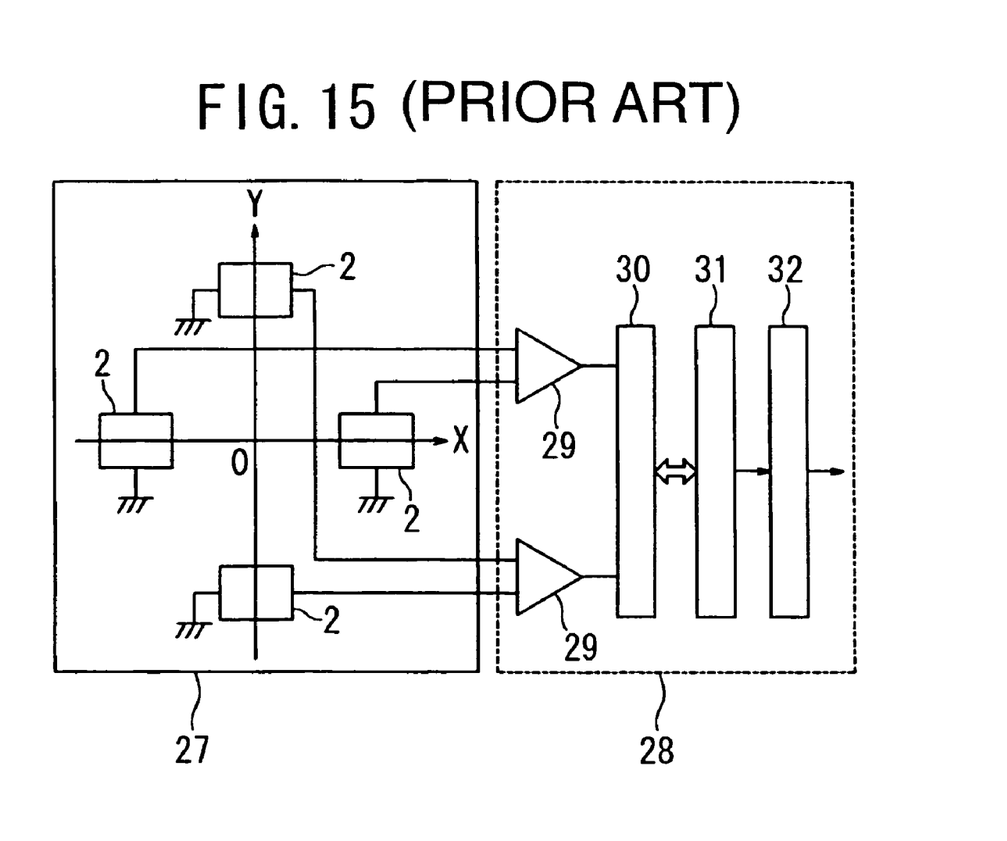
FIG. 15 is a circuit block diagram of a conventional magnetic sensor and pointing control circuit.

Upon displacement of the magnet 26, the Hall elements, 2a through 2d, detect a magnetic field strength as expressed by the function of a distance between the magnet and each of the Hall elements, 2a through 2d, and an orientation of the magnet, and cause a Hall voltage to occur at right angles to the direction of a current flowing through the Hall elements, 2a through 2d, respectively, and the magnetic field of the magnet FIG. 15 is a circuit diagram broadly showing a magnetic sensor and a circuit for processing a detection output of the magnetic sensor, as disclosed in JP-A H10-20999, A, for explaining a conventional magnetic sensor.

In FIG. 15, outputs of a magnetic sensor 27 comprising respective Hall elements disposed in the x-axis direction and respective Hall elements disposed in the y-axis direction are delivered to a pointing control circuit 28 comprising differential amplifiers 29, an A/D converter 30, a detection controller 31, and an output controller 32 to be thereby processed.

In the pointing control circuit 28, the outputs of the magnetic sensor 27 are amplified by the differential amplifiers 29, respectively, the respective outputs thereof are converted into digital values by the A/D converter 30, and digital outputs thereof are converted into an x-axis coordinate value and a y-axis coordinate value, respectively, by the detection controller 31 to be thereby sent out to the output controller 32.

As is evident from the foregoing explanation, with the conventional pointing device, the magnetic sensor and the pointing control circuit for processing the output of the magnetic sensor have occupied individual disposition regions, respectively, so that in the case of a small-size information equipment, an area dedicated for the pointing control circuit has become too large to be negligible.

Further, with the conventional pointing device, gallium arsenide (GaAs), indium antimonide (InSb), and so forth have been used as material for the Hall elements as constituent members of the magnetic sensor, however, Hall elements using silicon have not been in widespread use. This is because in the case of implementing integration of the Hall elements using silicon, it is difficult to obtain sufficient magnetic sensitivity in comparison with the case of using the material as described above.

SUMMARY OF THE INVENTION

The invention has been developed to resolve the problems encountered in the past, and it is therefore a first object of the invention to reduce an area dedicated for a pointing control circuit for processing an output of a magnetic sensor, thereby providing the magnetic sensor with the pointing control circuit. Further, a second object of the invention is to implement the magnetic sensor wherein the Hall elements are formed therein. Further, a third object of the invention is to implement the magnetic sensor wherein the Hall elements made of material low in magnetic sensitivity is combined with a pre-amp for amplifying respective detection voltages of the Hall elements so as to make up for a shortcoming in respect of magnetic sensitivity and those combined together are formed integrally with the pointing control circuit. Still further, a fourth object of the invention is to implement the magnetic sensor excellent in noise immunity, small in fluctuation of the characteristic thereof as a whole, and easy to handle as a single device.

In addition, a fifth object of the invention is to provide information equipment wherein the magnetic sensor with the pointing control circuit, fabricated as above, is assembled as a pointing device.

To that end, in accordance with a first aspect of the invention, there is provided a magnetic sensor with a pointing control circuit comprising an IC chip, substantially square in shape, with the pointing control circuit formed in the central part thereof, and Hall elements provided in four corners of the peripheral region of the pointing control circuit, respectively.

With the magnetic sensor with the pointing control circuit having these features, the Hall elements are preferably formed in the step of fabricating an IC.

Further, with the magnetic sensor with the pointing control circuit having these features, as above, Hall elements made of material low in magnetic sensitivity and a pre-amp for amplifying respective detection voltages of the Hall elements may be disposed in close proximity to each other, and may be formed integrally with the pointing control circuit in the step of fabricating an IC.

The invention provides in its second aspect information equipment having a pointing device comprising any of the magnetic sensors with the pointing control circuit, described above, and a magnet assembled into a deformable magnet holder, wherein a change in magnetic field strength due to displacement of the magnet is detected by the Hall elements.

The invention has an advantageous effect in that an area exclusively occupied by the pointing control circuit can be reduced since the Hall elements are disposed in the four corners of a chip, which is a dead space thereof, respectively, and the Hall elements are formed integrally with the pointing control circuit on the chip. Further, as a result of disposing the Hall elements in the four corners of the chip, respectively, both the Hall elements and chip are insusceptible to the effect of noises, thus rendering the invention advantageous from the viewpoint of noises as well.

Furthermore, since the Hall elements and the pointing control circuit are united together to be thereby formed on one chip, fluctuation in respective characteristics of the Hall elements, differential amplifiers, pointing control circuit, and so forth can be adjusted on the basis of the chip as a whole, so that fluctuation in the characteristic of a system in whole is eliminated, thereby enabling a magnetic sensor excellent in performance to be constructed.

In addition, by uniting the Hall elements with the pointing control circuit, it becomes possible to implement a device easy to handle as a magnetic sensor in the form of a single device.

PREFERRED EMBODIMENTS OF THE INVENTION

Embodiments of the invention are described hereinafter with reference to the accompanying drawings.

Figure 1:
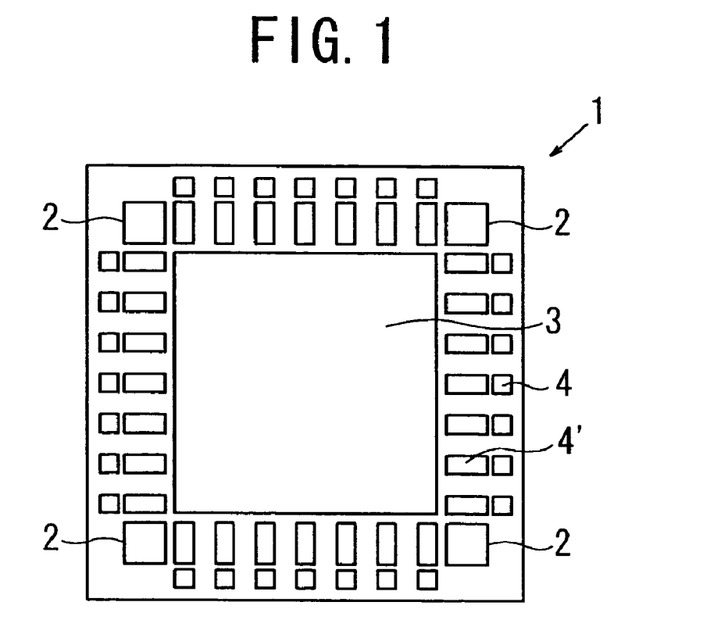
FIG. 1 is a plan view of a first embodiment of a magnetic sensor with a pointing control circuit according to the invention.

FIG. 1 is a plan view of a first embodiment of a magnetic sensor with a pointing control circuit according to the invention. The magnetic sensor 1 with the pointing control circuit comprises an IC chip, substantially square in shape, with the pointing control circuit 3 formed in the central part thereof, and bonding pads 4 for the pointing control circuit 3, and input/output (I/O) parts 4', disposed on the peripheral region of the pointing control circuit 3. The bonding pads 4 are connected with lead electrodes of a lead frame with a thin gold wire, respectively, and Hall elements 2 are disposed on four corner parts of the IC chip, respectively.

Two pairs of the Hall elements 2 disposed diagonally opposite to each other, on the IC chip square in shape, respectively, correspond to the pairs of the Hall elements disposed along the x-axis or the y-axis of the conventional magnetic sensor shown in FIG. 15, respectively, and a circuit condition is set such that the respective Hall elements 2 delivers zero output when a magnet is at a predetermined position. Accordingly, displacement of the magnet causes a magnetic field strength as detected by the Hall elements 2 to undergo a change, and such a change in the magnetic field strength is detected as a displacement voltage of the Hall elements 2.

With the Hall elements 2 disposed along the x-axis or the y-axis, respectively, in a cross-like manner, output voltages of two of the Hall elements 2 along the respective axes are delivered to the pointing control circuit 3 to be taken as a displacement amount along the x-axis and the y-axis, respectively.

With the magnetic sensor 1 with the pointing control circuit, the Hall elements 2 are formed integrally with the pointing control circuit 3 on one IC chip, so that considerable down-sizing is possible as compared with the conventional magnetic sensor wherein the pointing control circuit is formed separately from the Hall elements. Herein, the pointing control circuit 3 is not limited to logic circuits, but may comprise a CPU and a memory for storing software of the CPU. The shape of the IC chip may be substantially a square, but is preferably a regular square.

With a second embodiment of a magnetic sensor with a pointing control circuit according to the invention, Hall elements 2 are integrally formed with a pointing control circuit 3 in the step of fabricating an IC. That is, with the first embodiment of the invention, the Hall elements 2 are disposed in the four corner parts of the IC chip, respectively. However, with the second embodiment of the invention, the Hall elements 2 in the four corner parts of the IC chip, respectively, are formed integrally with the pointing control circuit 3 in the step of fabricating the IC, thereby fabricating the magnetic sensor with the pointing control circuit.

Figure 2:
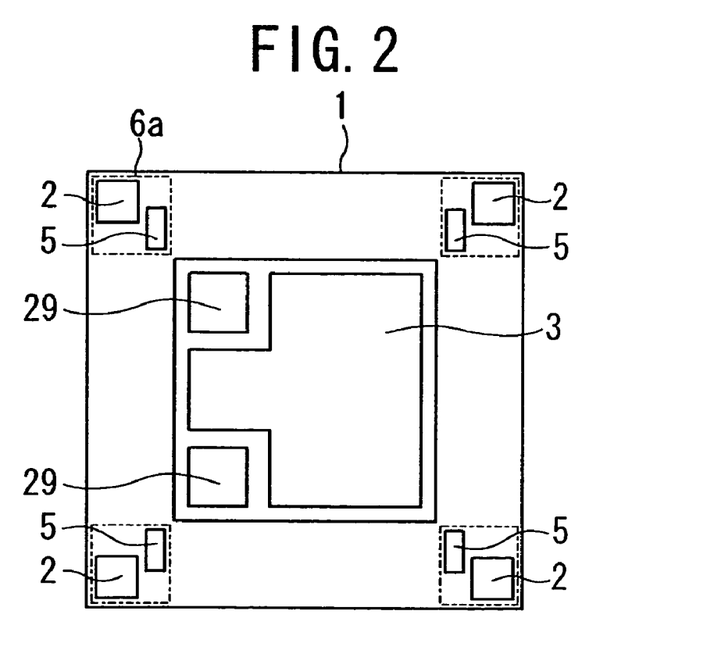
FIG. 2 is a plan view of a third embodiment of a magnetic sensor with a pointing control circuit according to the invention.
Figure 3:
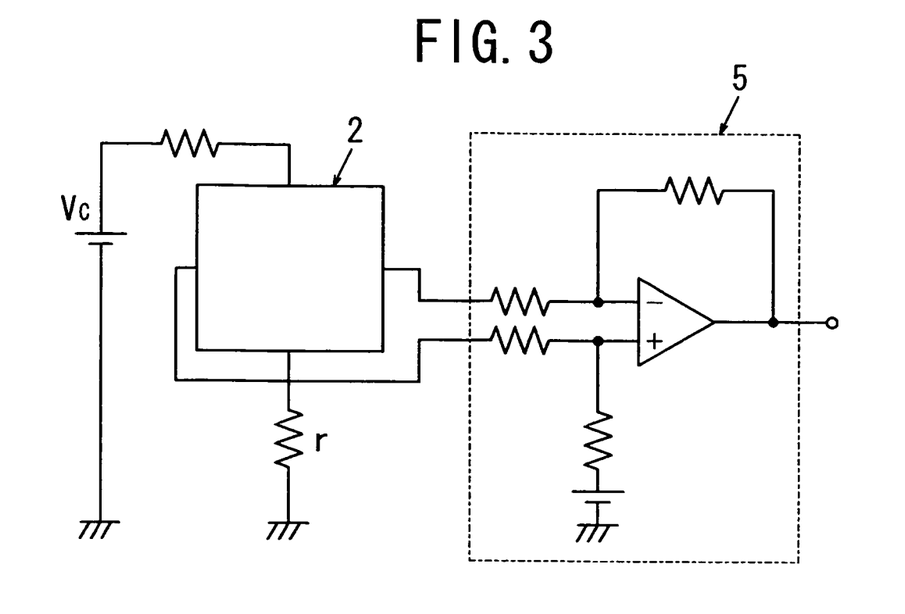
FIG. 3 is a circuit block diagram of a Hall element combined with a pre-amp.

FIG. 2 is a plan view of a third embodiment of a magnetic sensor with a pointing control circuit according to the invention. In order to employ Hall elements made of material low in magnetic sensitivity for use in a magnetic sensor, outputs of the Hall elements need to be amplified. FIG. 3 shows an amplifier circuit used for such a purpose. For the amplifier circuit, a differential amplification circuit (hereinafter referred to as a pre-amp) 5 is used, and the pre-amp 5 is formed in close proximity to a Hall element 2, and formed integrally therewith in four corner parts of the IC chip in the process of integrating the pointing control circuit 3. In this case, the pre-amp 5 can be formed so as to be adjacent to the Hall element 2, as shown in FIG. 2, or may be formed so as to be disposed above or below in relation to the Hall element 2 shown in FIG. 2.

With the present embodiment, the Hall elements 2, the pre-amps 5, and the pointing control circuit 3 are integrated by uniting those components together in the process of fabricating an IC, thereby forming a single device, so that fluctuation in respective characteristics of the Hall elements, pre-amps, and pointing control circuit, can be reduced by use of IC circuit techniques. Accordingly, fabrication can be implemented quite advantageously and with ease in respect of performance, cost, and size.

At the time of integrating the pre-amps 5 and the pointing control circuit 3 with the use of the Hall elements 2 made of silicon, integration can be achieved with greater ease particularly by use of CMOS techniques, and a variety of circuits can be implemented, which is advantageous.

As with the case of the first embodiment of the invention as shown in FIG. 1, the pointing control circuit 3 is not limited to logic circuits, but may comprise a CPU and a memory for storing software of the CPU and the shape of the IC chip may be substantially a square, but is preferably a regular square.

Figure 4:
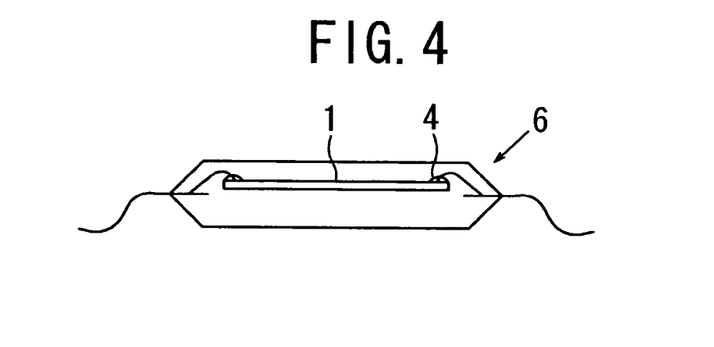
FIG. 4 is a longitudinal sectional view of the magnetic sensor with the pointing control circuit according to the invention after packaged.

FIG. 4 is a longitudinal sectional view of a magnetic sensor 6 for pointing, wherein the Hall elements 2 and the pointing control circuit 3, shown in FIG. 1 or 2, are integrally formed, and covered with molded resin before packaged. As shown in the figure, with the magnetic sensor 1 having the Hall elements 2, bonding pads 4 are connected to an integrated circuit serving as the pointing control circuit 3 with a bonding wire, respectively. The magnetic sensor 1 is packaged with the molded resin that is generally used in packaging.

Figure 5:
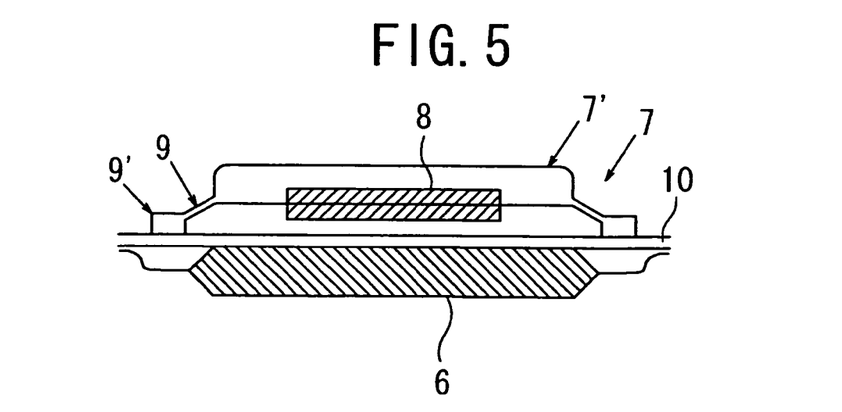
FIG. 5 is a longitudinal sectional view of a pointing device formed by combining the magnetic sensor of the invention after packaged with a magnet holder.

FIG. 5 is a longitudinal sectional view of a pointing device formed by combining the magnetic sensor 6 as packaged, shown in FIG. 4, with a magnet holder 7 constituting an input unit.

In the figure, the pointing device comprises the magnet holder 7 made up of a flexible member made of rubber, and so forth, disposed on top of a printed circuit board 10, for holding a magnet 8 in such a manner as to be displaced in relation to the magnetic sensor 6 as packaged, and the magnetic sensor 6 as packaged, disposed under the magnet holder 7 through the intermediary of the printed circuit board 10. The magnet holder 7 constitutes the input unit of the pointing device, and comprises a body potion 7' housing the magnet 8, a base portion 9' annular in shape, disposed on top of the printed circuit board 10, and a bridging part 9 in skirt-like shape, linking the base portion 9' with the body potion 7' housing the magnet 8. Needless to say, the magnetic sensor 6 as packaged, provided with the pointing control circuit, can be combined with a magnet holder (for example, a holder made up of a coil spring), other than the magnet holder 7 made up of the flexible member, as described above. As for packaging, the magnetic sensor may be packaged with any molding material. Further, the pointing device without being packaged may be mounted on a printed circuit board by chip-on-board techniques. Furthermore, a board on which the pointing device is mounted is not limited to a printed circuit board, but the board may be a plastic film.

Since the pointing device is fabricated by combining the magnetic sensor 6 as packaged, having the pointing control circuit, with the magnet holder 7 constituting the input unit, space-saving of the pointing device is implemented to the extent of the pointing control circuit part thereof, which is quite advantageous in down-sizing of information equipment such as a cellular phone, and so forth.

Further, it goes without saying that the invention is applicable to any pointing device using Hall elements.

Now, there are described hereinafter circuit techniques for stabilizing circuit operation, saving energy, lowering noises, and so forth, upon implementation of the magnetic sensor according to the invention.

(1) Improvement of Temperature Characteristic

Figure 6:
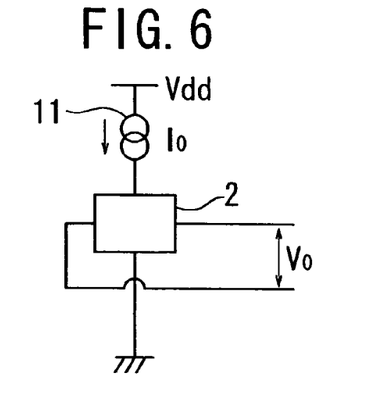
FIG. 6 is a circuit block diagram of a Hall element single body combined with a current source.
Figure 7:
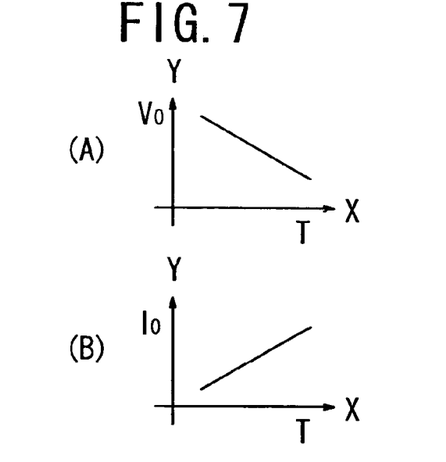
FIGS. 7(A) and 7(B) are graphs showing the temperature characteristic of the Hall element in relation to the current source, shown in FIG. 6.

FIG. 6 shows a magnetic detection circuit comprising a Hall element single body 2 and a current source 11. The current source 11 is connected to the Hall element 2, and current 10 is delivered thereto, whereupon an output voltage of the Hall element 2 is assumed to be V0. Upon plotting a temperature vs. output voltage relationship with temperature taken along the x-axis and output voltage taken along the y-axis while input current is kept constant, the temperature characteristic of the Hall element 2 is expressed by a sloped line falling towards the right as shown in FIG. 7(A). In this case, if the Hall element 2 is combined with a current source having a temperature characteristic expressed by a sloped line rising towards the right as shown in FIG. 7(B), the temperature characteristic of the magnetic detection circuit is cancelled out, so that the temperature characteristic of the pointing device is rendered constant regardless of temperature, thereby enabling a stable temperature characteristic to be obtained.

(2) Low Power Consumption

Figure 8:
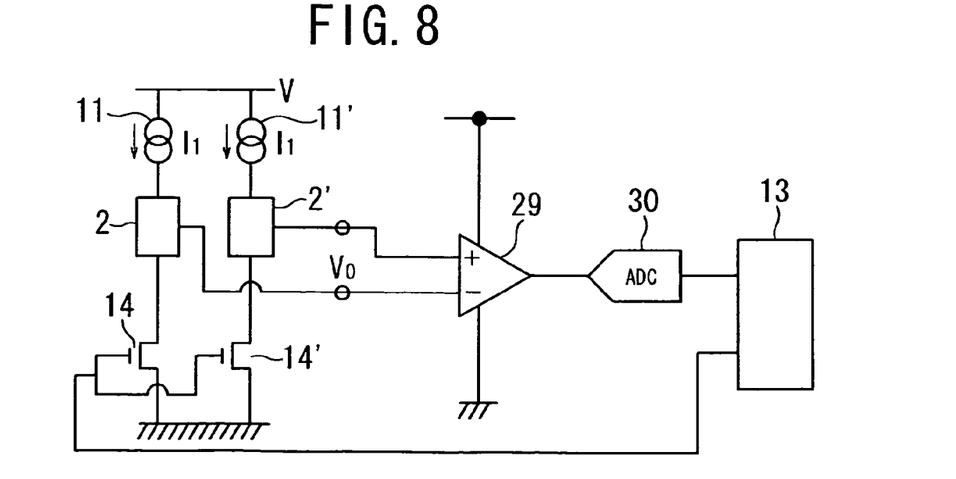
FIG. 8 shows a circuit for performing magnetic detection by sampling techniques.

The pointing device is used as a user interface, however, there is no need for performing magnetic detection all the time. Accordingly, by energizing magnetic elements intermittently with the use of sampling techniques, power consumption can be reduced. FIG. 8 shows a circuit for such a purpose.

Respective drain electrodes of FETs 14 (14') with sources grounded are connected to respective Hall elements 2 (2') of the magnetic detection circuits each comprising current sources 11 (11') and the Hall elements 2 (2'). Respective Hall currents of the Hall elements 2, 2' are sent out to an A/D converter 30 via a differential amplifier 29. Output digitalized by the A/D converter 30 is delivered to a digital processing/data maintain control circuit 13 to be thereby processed. A signal for sampling is fed from the digital processing/data maintain control circuit 13 to respective gates of the FETs 14, 14', thereby turning the FETs 14, 14' ON during a period of magnetic detection.

Figure 9:
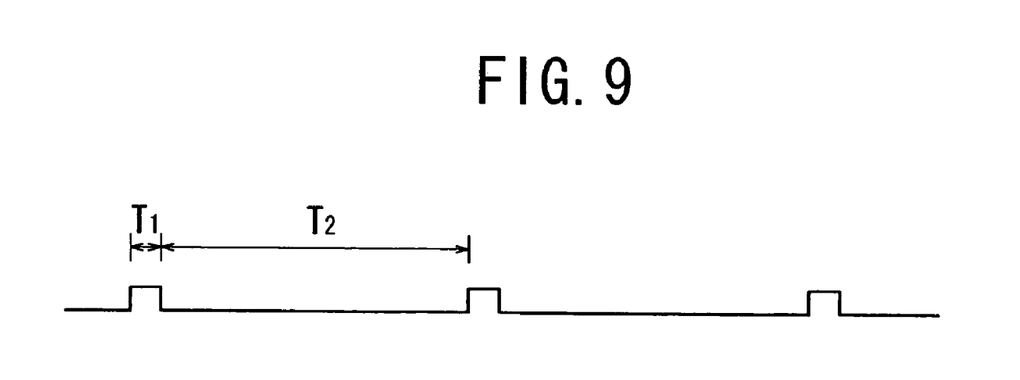
FIG. 9 is a time chart for sampling in the circuit shown in FIG. 8.

FIG. 9 is a time chart for the operation of the circuit shown in FIG. 8, and a period T1 is a period when the Hall elements 2, 2' are energized for magnetic detection while a period T2 is a period when data detected by the magnetic sensor during this period are processed and maintained. Values obtained by magnetic detection are converted into digital values by the A/D converter to be subsequently processed before stored in a register (not shown). The digital values as stored can be maintained with minute power by use of a CMOS circuit.

(3) Noise Reduction

Reduction in current fed to the Hall element 2 can reduce power consumption. On the other hand, since an output of the Hall element 2 is small, the output needs to be amplified by use of the preamp. Because of an increase in the noise characteristic of the preamp beyond a negligible extent if an input signal is too small, there is the need for taking into consideration even a layout of the Hall element 2 and the preamp. With the third embodiment of the invention, because a signal transmitted through a path from circuits 6a, uniting the Hall elements 2 with the preamp 5, respectively, to the respective differential amplifiers 29 is small in magnitude and susceptible to noises, the signal needs to be isolated from an IC circuit part so as to be protected from noises.

Figure 10:
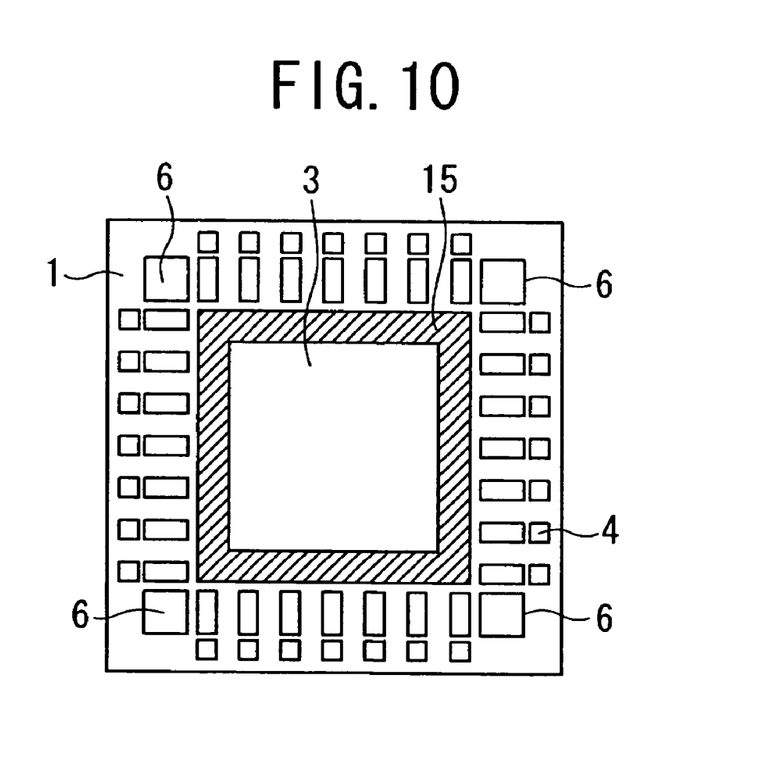
FIG. 10 is a plan view of the magnetic sensor with the pointing control circuit according to the invention, provided with an area dedicated exclusively for processing of analog signals.

To that end, with the invention, as shown in FIG. 10, an area 15 dedicated exclusively for processing of analog signals is disposed outside of the pointing control circuit 3 of the IC, and inside of a region of the IC where the bonding pads 4 and the respective circuits 6a uniting the Hall elements 2 with the preamp 5 are formed to thereby isolate the signal from a region of a digital circuit (the pointing control circuit 3 excluding the differential amplifiers 29).

As a result of such an isolation implemented as described above, the transistor of the preamp 5 can be increased in size to thereby enhance the noise characteristic, and further, a current feeding condition is improved because the current source becomes closer to the I/O parts. In addition, since a distance up to the respective differential amplifiers and a distance between the respective differential amplifiers and the pointing control circuit can be shortened, the noise characteristic can be improved.

(4) Offset Cancellation

Figure 11:
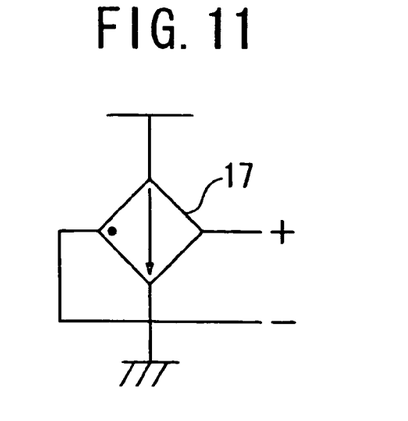
FIG. 11 is a view for defining the offset characteristic of a Hall element.
Figure 12:
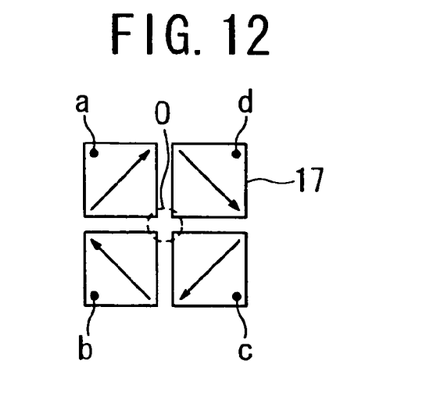
FIG. 12 is a view showing a configuration wherein four of the Hall elements shown in FIG. 11 are combined so as to cancel out respective offset voltages thereof.

When a magnetic filed is at zero, it is desirable that an output voltage of the Hall element is 0V, however, even if a magnetic filed is rendered to zero, the output voltage of the Hall element in practice does not become 0V because of the presence of an offset voltage. Accordingly, there is the need for canceling the offset voltage. FIG. 11 is a view showing that when current is caused to flow in the direction of the arrow through a Hall element 17, and a magnetic field becomes zero, an offset voltage appears in the direction of a black dot in the Hall element 17. FIG. 12 is a view showing a configuration wherein four of the Hall elements 17 as defined in FIG. 11 are disposed such that respective directions of current are varied by 90 degrees, and the center 0 of the four Hall elements 17 is used as one electrode while respective outside corners (a, b, c, and d) thereof is used as one electrode, respectively, thereby taking out respective outputs in parallel to enable the four Hall elements 17 to function as one element. Since this configuration causes the respective directions of current to be shifted by 90 degrees, respective offset voltages of the four Hall elements 17 cancel out each other.

The invention claimed is:

1. A magnetic sensor comprising:
    an IC chip, substantially square in shape and defining a central part and at least two pairs of diagonally opposed corners;
    a pointing control circuit formed in said central part of the IC chip and defining a peripheral region;
    a plurality of Hall elements, each comprising a material low in magnetic sensitivity and being formed on said IC chip at a location outside of said peripheral region of said pointing control circuit, at least one of said plurality of Hall elements being formed at each of said diagonally opposed corners; and
    a plurality of pre-amps formed on said IC chip for amplifying respective detection voltages of the Hall elements, said pre-amps being disposed in close proximity to each other,
    wherein at least said pre-amps and said pointing control circuit are formed integrally.

2. The magnetic sensor as claimed in claim 1, further comprising at least one differential amplifier also formed in said central part.

3. The magnetic sensor as claimed in claim 1, wherein said Hall elements, pre-amps and pointing control circuit are formed integrally.

4. The magnetic sensor as claimed in claim 2, wherein said Hall elements, pre-amps, differential amplifiers and pointing control circuit are formed integrally.

5. The magnetic sensor as claimed in claim 1, wherein said pointing control circuit comprises a CPU and memory.

6. The magnetic sensor as claimed in claim 1, wherein said pre-amps are formed so as to be disposed adjacent to said Hall elements.

7. The magnetic sensor as claimed in claim 1, wherein said pre-amps are formed so as to be disposed above or below said Hall elements.

8. The magnetic sensor as claimed in claim 1, further comprising bonding pads coupled to said pointing circuit, at least one bonding wire coupled to one of said bonding pads and a molded resin which encompasses said IC chip, said bonding pads and a portion of said at least one bonding wire.

9. The magnetic sensor as claimed in claim 1, wherein said sensor comprises four Hall elements disposed such that respective directions of current are varied by 90 degrees, and a center of the four elements is used as one electrode while respective outside corners are used as another electrode, respectively.

10. The magnetic sensor as claimed in claim 1, further comprising an area on the IC chip disposed in said peripheral region outside of the pointing control circuit and inside of said Hall elements, and being dedicated exclusively for processing of analog signals.

* * * * *